United States Patent
Drigani et al.

(10) Patent No.: US 8,585,294 B2
(45) Date of Patent: Nov. 19, 2013

(54) CONNECTION COMPONENT FOR OIL FILM BEARINGS

(75) Inventors: Fausto Drigani, Zugliano-Pozzuolo Del Friuli (IT); Marco Di Giacomo, Cormons (IT); Alfredo Poloni, Fogliano Redipuglia (IT)

(73) Assignee: Danieli & C. Officine Meccaniche SpA, Buttrio (IT)

( * ) Notice: Subject to any disclaimer, the term of this patent is extended or adjusted under 35 U.S.C. 154(b) by 147 days.

(21) Appl. No.: 13/260,164

(22) PCT Filed: Mar. 25, 2010

(86) PCT No.: PCT/IB2010/000666
§ 371 (c)(1),
(2), (4) Date: Sep. 23, 2011

(87) PCT Pub. No.: WO2010/109310
PCT Pub. Date: Sep. 30, 2010

(65) Prior Publication Data
US 2012/0020594 A1 Jan. 26, 2012

(30) Foreign Application Priority Data
Mar. 26, 2009 (IT) .............................. UD2009A0062

(51) Int. Cl.
*F16C 32/06* (2006.01)
*F16C 33/02* (2006.01)

(52) U.S. Cl.
USPC .......................... 384/276; 384/118; 384/296

(58) Field of Classification Search
USPC ......... 384/114, 118, 276, 279, 281, 282, 291, 384/292, 907; 29/898.054, 898.059
See application file for complete search history.

(56) References Cited

U.S. PATENT DOCUMENTS

| | | | |
|---|---|---|---|
| 3,453,031 A | 7/1969 | Rickley et al. | |
| 4,134,309 A | 1/1979 | Balke et al. | |
| 4,159,152 A | 6/1979 | Bjork | |
| 4,352,229 A * | 10/1982 | Moore, Jr. | 492/1 |
| 4,459,048 A * | 7/1984 | Stachuletz | 384/291 |
| 6,123,461 A * | 9/2000 | Wojtkowski, Jr. | 384/441 |
| 6,468,194 B2 * | 10/2002 | Wojtkowski et al. | 492/47 |
| 6,695,480 B1 * | 2/2004 | Ramsay et al. | 384/110 |
| 7,484,891 B2 * | 2/2009 | Keller et al. | 384/100 |

FOREIGN PATENT DOCUMENTS

| | | |
|---|---|---|
| DE | 620581 | 10/1935 |
| DE | 943868 C | 6/1956 |
| FR | 2405761 A1 | 5/1979 |
| WO | 03022471 A1 | 3/2003 |

OTHER PUBLICATIONS

International Search Report dated Jul. 28, 2010 from priority application No. PCT/IB2010/000666.

* cited by examiner

*Primary Examiner* — Phillip A Johnson
(74) *Attorney, Agent, or Firm* — Novak Druce Connolly Bove + Quigg, LLP (57) ABSTRACT

A connection element able to be located between a part or neck of a rolling roll and a relative housing bushing as present in a chock for rolling stands, including a first external element and a second internal element, mating and coupled, wherein the second internal element has internally a seating at least partly truncated cone shaped for coupling with the neck of the rolling roll.

17 Claims, 5 Drawing Sheets fig. 1 fig. 2 fig. 3 fig. 4 fig. 5 fig. 6 fig. 7 fig. 8

CONNECTION COMPONENT FOR OIL FILM BEARINGS

CROSS-REFERENCE TO RELATED APPLICATIONS

This application is a §371 National Stage Application of International Application No. PCT/IB2010/000666, filed on 25 Mar. 2010, claiming the priority of Italian Patent Application No. UD2009A000062 filed on 26 Mar. 2009.

FIELD OF THE INVENTION

The present invention concerns a connection component or sleeve for oil film bearings, or oil coating bearings, as used in rolling mills.

In particular the present invention concerns a connection component or sleeve for the bearings which are positioned at the two sides of the rolls in rolling stands and which cooperate with the conical necks of the rolls supported there.

BACKGROUND OF THE INVENTION

It is known that the bearings in question are associated with the end parts of the rolls, or necks, in rolling stands, which end parts have a conical surface.

It is also known that said conical surface is associated with a connection component or element which, internally, has a seating mating with said conical part of the rolling roll and externally has a cylindrical surface suitable to cooperate with a bushing made of a low friction material.

The support, chock, sealing and clamping elements and the like are taken as known.

It is also known that the modern tendency is to load the rolls more and more, so as to exert an ever greater rolling pressure, and therefore, to reduce the number of passes which have to be carried out in order to obtain the desired reductions.

Moreover, there is also the requirement that all the components should last longer and that it should cost as little as possible to replace and/or maintain them.

These requirements, however, come into conflict with problems of dimensions and bulk.

Furthermore, any change to the sizes and/or structure of the bearings can cause problems of supply, storage of spare parts, the speed of replacement or maintenance and others.

It is also known that changes to the sizes which affect the conical part of the end parts of the rolling rolls create, in rolling plants when there are updates and/or interruptions, an excessive cost due to the replacement of the rolls and the bearings units with unacceptable investments.

DE-C-943868 discloses a connection element located between a neck of a rolling roll and a relative housing bush and comprising an external element made of a sliding thermoplastic material and an internal element mating and coupled, the internal element having internally a seating partly truncated cone shaped for coupling with the neck of the rolling roll.

The present invention intends to overcome the disadvantages of the prior art, and others, which will become clear in the following description, allowing to obtain, with an innovative and only apparently simple component or sleeve, the best and the most extensive results, using the current bulk sizes.

The Applicant has devised, tested and embodied the present invention to overcome the shortcomings of the state of the art and to obtain these and other purposes and advantages.

SUMMARY OF THE INVENTION

The present invention is set forth and characterized in the independent claim, while the dependent claims describe other characteristics of the invention or variants to the main inventive idea.

According to the present invention, the connection component or element or sleeve, which is placed between the neck of the rolling roll and a bushing made of low friction material, as can be found in a chock for rolling stands, in practice is maintained substantially in its current dimensions but is obtained in two substantially tubular elements, mating and coupled. The two elements are disposed coaxially one inside the other.

According to the present invention, the two mating elements comprise a first external element and a second internal element, and the second element has a truncated conical seating for coupling with the neck of the rolling roll.

According to the present invention, the second internal element can be made of a material, typically of metal, less valuable than the material of the first external element, for example bronze, cast iron, spheroidal cast iron, or steel or other suitable material and can be obtained for example by fusion, thus reducing costs.

Moreover, according to the present invention, the first external element is made of hard, valuable material, typically a hard and valuable metal, while the second internal element is made of a less valuable material.

According to a variant, the first external element is of a material having a Brinell hardness comprised between about 325 HB and about 375 HB.

To give an example, the first external element is made of a hardened and tempered steel which has been heat treated.

In some forms of embodiment, the first element and the second element have diameters and thicknesses so as to define a region of cooperation with each other.

The two mating elements, because of their structure, thanks to the region of cooperation defined between them, allow ovalizations or in any case deformations in relation to the more or less cyclical load which the rolling roll exerts.

According to one form of embodiment, the internal element has the surface of the truncated cone seating hardened by a normal hardening process.

According to another form of embodiment, the truncated cone seating of the internal element has an angle of inclination with a width comprised between about 3° and about 7° with respect to the central axis of rotation of the roll.

According to a first formulation of the present invention, the external element has a substantially cylindrical shape and has a cylindrical internal seating or surface. Consequently the second internal element has an externally cylindrical shape mating with the cylindrical shape of the first element, and internally has said truncated cone seating.

With the first formulation therefore, the region of cooperation between the first and second element has a cylindrical shape.

In accordance with a second formulation of the present invention, the first external element has a substantially cylindrical external shape and an internal truncated cone seating, or surface. The second internal element consequently has a truncated cone shape mating with the internal truncated cone surface of the first element and internally has the truncated cone seating mating with the neck of the roll.

With the second formulation therefore, the region of cooperation between the first and second element has a truncated cone shape.

In relation to the first formulation, the external element having a cylindrical shape has a constant thickness which varies from about 20 mm to about 40 mm, advantageously around 25 mm-30 mm.

In relation to said second formulation, the internal element having a substantially truncated cone shape has a constant thickness which varies from about 10 mm to about 25 mm, advantageously about 15 mm-18 mm. These dimensions, in relation to normal diameters, allow the component to ovalize cyclically in a widely elastic range.

The solution according to the present invention allows not only to maintain the neck of the rolls unchanged, but also to simplify and/or speed up the maintenance or replacement operations, in that it is possible to replace even one or the other of the two components according to the requirements which arise each time.

By means of the structure of the connection element to the neck of the roll according to the present invention, it is therefore possible to allow the bearings to support higher loads, loads which can be greater than any yet reached, even by 15-20%, for the reasons explained hereafter in the description.

The structure of the connection element to the neck of the roll, formed by the first external element and by the second internal element, allows an elastic deformation, or ovalization, of the connection element under the rolling load.

Due to the ratios in size and the work cycle, and therefore the deformation of the axis of the rolls, the ovalization can affect the whole connection element, and therefore is greater in the more external part, and is progressively reduced, even as desired by the designer, toward the inside.

The elastic deformation of the first external element, which cooperates with the bushing of the bearing, on the one hand entails a redistribution of the hydro-dynamic pressures, in the oil passage between bushing and first external element, which support the connection element according to a load angle, and therefore a considerably greater surface because of the effect of the deformation of the geometry of the passage; and on the other hand, a decrease in the maximum peak of the hydro-dynamic pressure field which develops inside the passage.

This phenomenon allows to obtain bearings with a greater load capacity whilst always maintaining a specific load within the dimensional limits allowed.

According to said first formulation of the present invention, the two elements, internal and external, because of the cyclical action of the load on the rolls, can move with respect to each other.

According to a first variant relating to the first formulation of the present invention, the internal and external elements are keyed to each other by interference and an anti-friction factor is provided along the cylindrical region of cooperation between the elements.

The anti-friction factor, according to a first variant, consists of anti-friction means, such as a layer of anti-friction material, such as for example a layer of bronze, having a thickness comprised of between about 0.5 mm and 2.0 mm, advantageously about 1 mm.

According to another variant relating to the first formulation of the present invention, an annular chamber is provided, in the region of cooperation between the first external element and the second internal element, having a height comprised between about 0.1 mm and about 0.3 mm, advantageously about 0.2 mm, into which pressurized oil can be introduced.

A further variant relating to said first formulation of the present invention provides, in the region of cooperation between the first external element and the second internal element, a groove, advantageously with a trapezoidal shape, having a depth comprised between about 0.1 mm and 0.3 mm, advantageously about 0.2 mm, which develops in a spiral around the surface of the first and the second element, and which, according to a variant can also be filled with pressurized oil.

BRIEF DESCRIPTION OF THE DRAWINGS

These and other characteristics of the present invention will become apparent from the following description of a preferential form of embodiment, given as a non-restrictive example with reference to the attached drawings wherein.

To facilitate understanding, identical reference numbers have been used, where possible, to identify common identical elements in the drawings. It is understood that elements and characteristics of one form of embodiment can be conveniently incorporated in other forms of embodiment without further explanations.

DETAILED DESCRIPTION OF A PREFERENTIAL FORM OF EMBODIMENT

Figure 1:
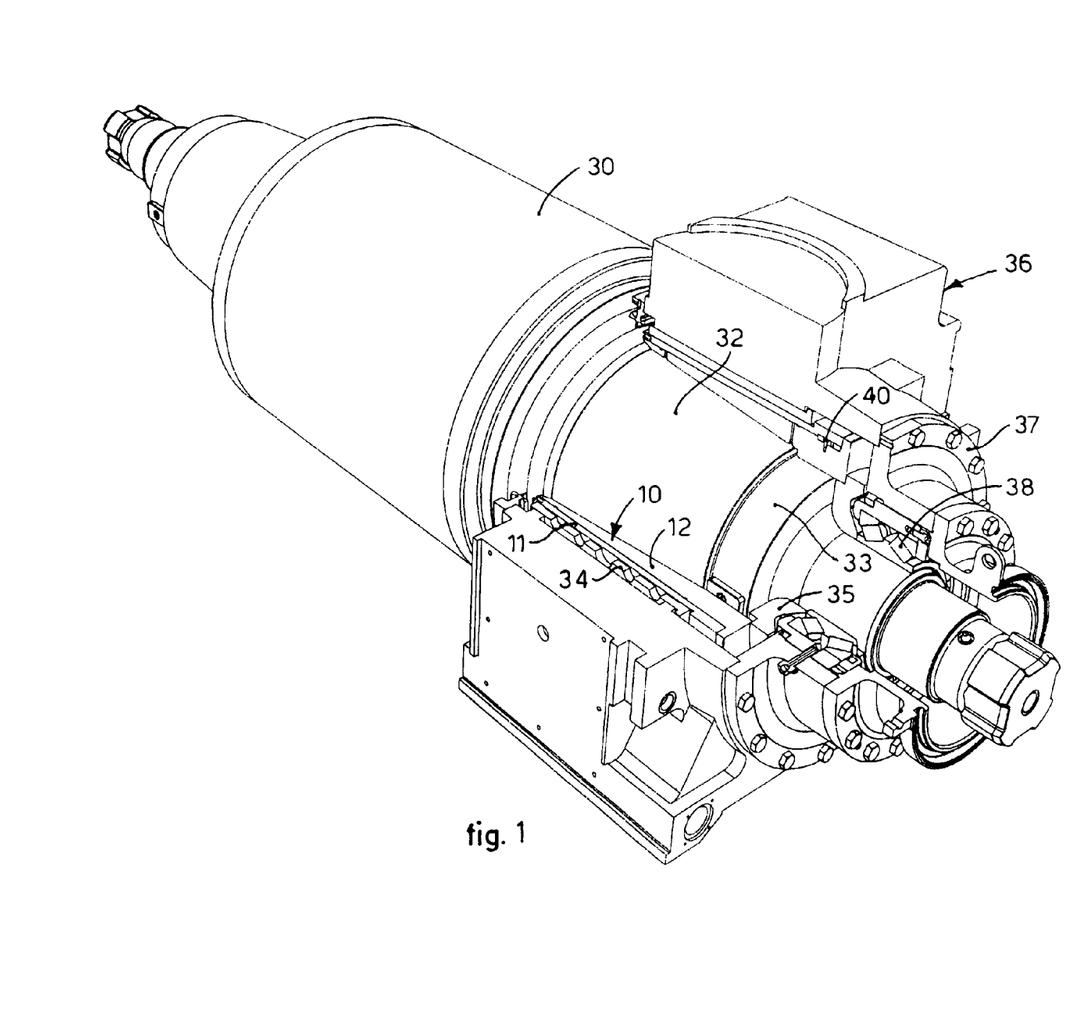
FIG. 1 is a three-dimensional section view of a normal bearing, complete with chock, for rolling stands, with the innovation according to the present invention in a first formulation.

With reference to FIG. 1, a connection component or element or sleeve 10 according to the present invention, is placed between the conical neck 32 of the rolling roll 30 of a rolling stand of a rolling mill, and a relative housing bushing 34, typically made of low friction material, as in a chock 36 for rolling stands.

In FIG. 1 the bearings 38, of the traditional type, are visible, with a relative shoulder ring 35. Everything is clamped by a clamping flange 37.

Figure 2:
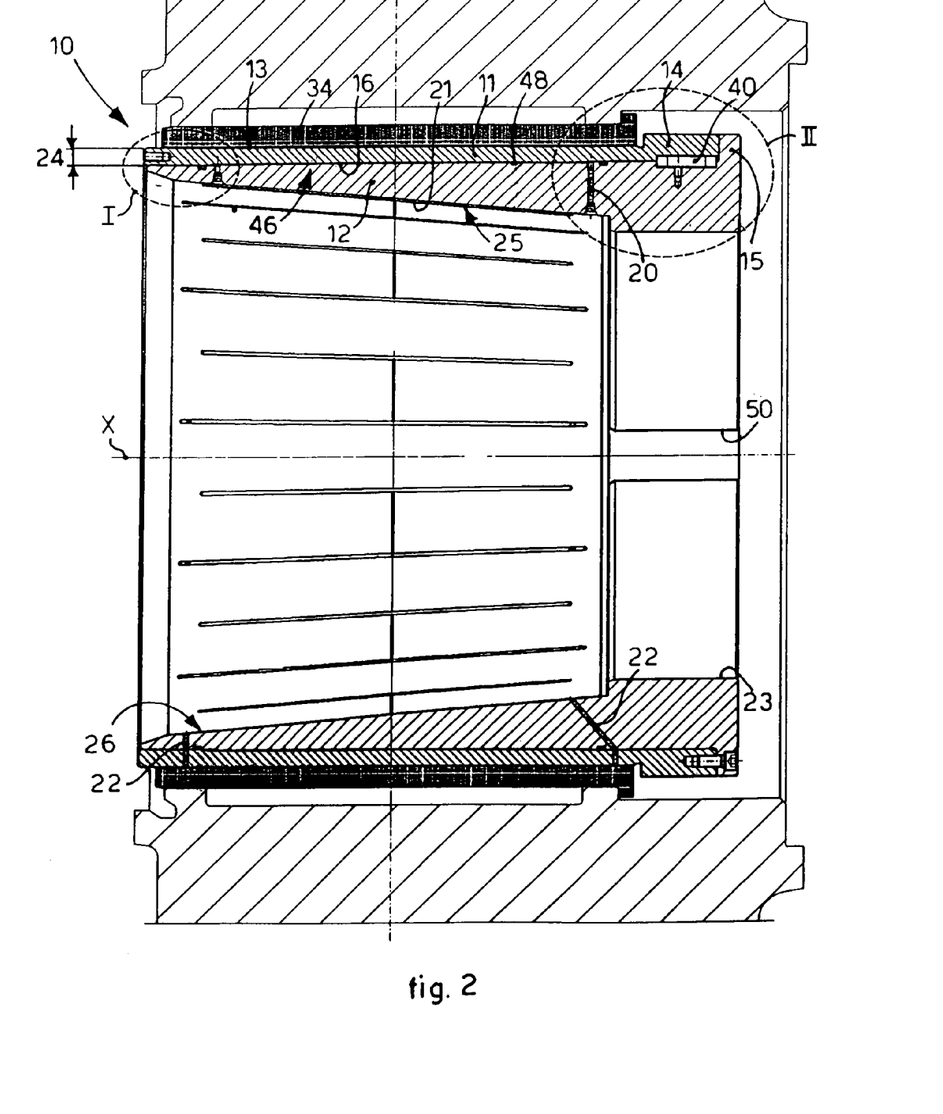
FIG. 2 is a section of the connection element according to a first formulation of the present invention.

The connection element or sleeve 10, coaxial to the axis of rotation X of the roll 30, according to a first formulation of the present invention as shown in FIGS. 1 and 2, is formed by two mating and coupled elements 11, 12, that is, a first external element 11 and a second internal element 12.

Both the first element 11 and the second element 12 are of the tubular or annular type, that is, with an axial symmetry.

According to said first formulation, the first external element 11 has substantially a cylindrical shape with a cylindrical internal surface 16 which delimits a seating in which the second element 12 is coupled.

The second element 12 has a cylindrical external surface, mating with the cylindrical shape of the first element 11 and inside it has a surface that delimits a truncated cone seating 26 for coupling to the neck 32 of the roll 30.

The wall which delimits the cylindrical internal surface 16 of the first element 11 cooperates with the mating external surface of the second internal element 12 so as to define a region of cooperation 46, in this case with a cylindrical geometry, between said two elements 11 and 12. The region of cooperation 46 is obtained by carefully choosing thicknesses and diameters of the first element 11 and the second element 12, as explained hereafter in the description.

The first element 11 has a sliding surface 13 on the outside, substantially cylindrical, which cooperates, in normal functioning, with the internal surface of the bushing 34.

In the interspace comprised between the sliding surface 13 and the internal surface of the bushing 34 a passage of oil forms on which the known functioning of the hydro-dynamic bearing is based.

The first element 11 also has, at one end, typically facing toward the outside of the rolling stand, a first positioning ridge 14 on which the bushing 34 abuts (FIG. 2).

The thickness 24 (FIG. 2) of the first element 11, according to said first formulation of the invention, is comprised between about 20 mm and about 40 mm, advantageously around 25-30 mm.

The surface which delimits the truncated cone seating 26 of the second element 12 is able to couple to the neck 32 of the rolling roll 30.

The coupling truncated cone seating 26 is formed by a first part 21 with a properly truncated cone shape (so that the cross section can be considered of a trapezoidal shape), in which the conical neck 32 is housed, and a second part 23 with a cylindrical shape, for the coupling of a cylindrical terminal end 33 of the rolling roll 30. Said coupling is obtained by means of a key on two respective seatings for keys 50 made on the cylindrical surface of the second part 23 and disposed at 180° with respect to the axis of rotation X.

The first truncated cone part 21 has an angle of inclination with an amplitude comprised between about 3° and about 7° with respect to the central axis of rotation X of the roll.

The second element 12 also has, externally, a second ridge 15 for coupling to the first element 11.

According to the present invention, the first external element 11 is made of hard material, typically a valuable hard metal, whilst the second internal element 12 is made of a less valuable material. To give an example, the first element 11 consists of a hardened and tempered steel type material (of the 50CrMo4 type) which has been heat treated, for example quenched, and having a Brinell hardness comprised between about 325 HB and about 375 HB.

The internal surface or wall 25 of the second element 12, which delimits at least the first part 21 of the truncated cone seating 26, is advantageously hardened by a normal hardening process.

According to the present invention, the first element 11 and the second element 12 are connected to each other using alternative different solutions described below.

Figure 4:
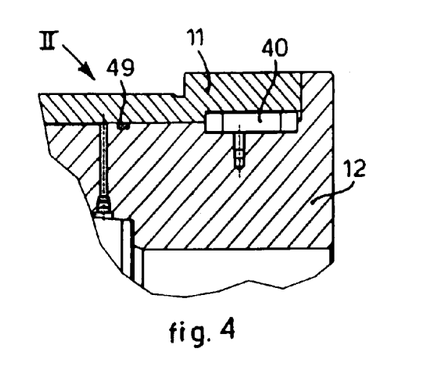
FIG. 4 is a form of embodiment of the enlarged detail II in FIG. 2.

In particular, according to a first variant as shown in FIG. 4, the first element 11 and the second element 12 are clamped to each other by means of a key 40. The specific solution with key 40 is shown, to give a non-restrictive example, also in FIG. 1.

Figure 5:
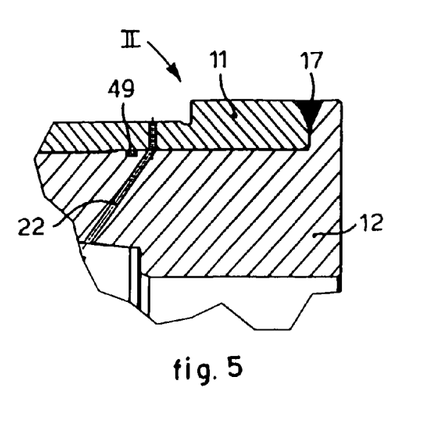
FIG. 5 is another form of embodiment of the enlarged detail II in FIG. 2.

A second variant, FIG. 5, provides clamping by means of welding, in the welding region shown for example by the reference number 17.

Figure 6:
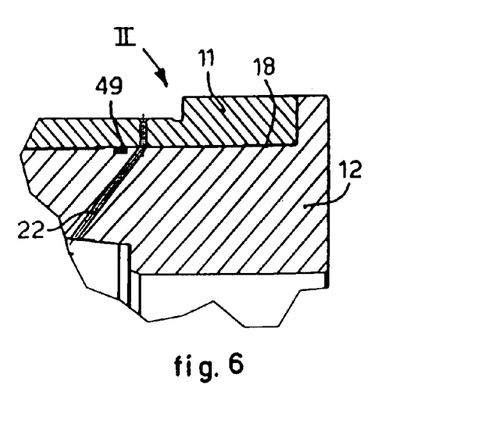
FIG. 6 is a further form of embodiment of the enlarged detail II in FIG. 2.

A third variant, FIG. 6, provides gluing, in a suitable gluing region indicated for example by the reference number 18.

Figure 3:
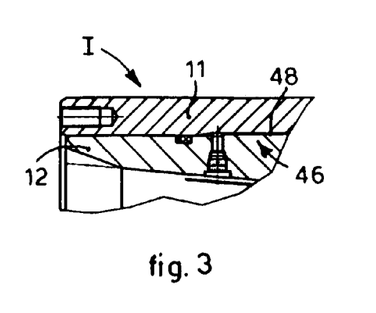
FIG. 3 is an enlarged detail I of FIG. 2.

In accordance with a first form of embodiment of the first formulation of the present invention, the first element 11 and the second element 12 are coupled to each other along the cylindrical internal surface 16 of the first element 11 by means of same-shape coupling through interference (zero play), as can be seen in detail in FIG. 3, between the cylindrical internal wall of the first element 11 and the mating external surface of the second element 12.

In this case an antifriction factor can be provided along the cylindrical region of cooperation 46 between the first element 11 and the second element 12.

The antifriction factor, according to one solution of the present invention, consists of a layer of antifriction material, such as for example a layer of bronze, having a thickness comprised between about 0.5 mm and 2.0 mm, advantageously about 1 mm, interposed between the first element 11 and the second element 12.

In accordance with a second form of embodiment of said first formulation of the present invention, the first element 11 and the second element 12 are coupled to each other, along the cylindrical internal surface 16 of the first element 11, with a certain continuous or discontinuous gap, defining the region of cooperation 46.

According to a first variant of the second form of embodiment, an annular chamber 48 is then made in the region of cooperation 46 between the first element 11 and the second element 12, having a constant height comprised between about 0.1 mm and 0.3 mm, advantageously about 0.2 mm, inside which pressurized oil can also be introduced, by means of a circuit which receives the oil from at least an adduction channel 20 made in the second element 12, which puts the seating 26 in communication with the annular chamber 48.

Channels 22 can be provided to carry pressurized oil from the bushing 34 toward the inside of the seating 26 of the second element 12.

According to another variant of the second form of embodiment, a seating or groove, which has a trapezoidal shape in cross section, is also provided in the region of cooperation 46 between the first element 11 and the second element 12.

The seating or groove develops advantageously in a spiral along the region of cooperation 46, around the axis of rotation X, and is advantageously comprised between the channels 22 which introduce the pressurized oil, by means of which the spiral seating or groove itself can also be filled with pressurized oil.

The spiral seating or groove is made in the thickness of the first element 11 and/or of the second element 12 and has a depth comprised between about 0.1 mm and 0.3 mm.

It is clear that other geometric shapes of the section of the spiral seating can be provided, such as for example square, rectangular, with beveled angles or curvilinear, even if the trapezoidal seating is advantageous in that it can better support the peak loads due to the action of the roll.

If pressurized oil is used, the present invention provides a sealing chock 49 (FIGS. 4, 5 and 6).

Figure 7:
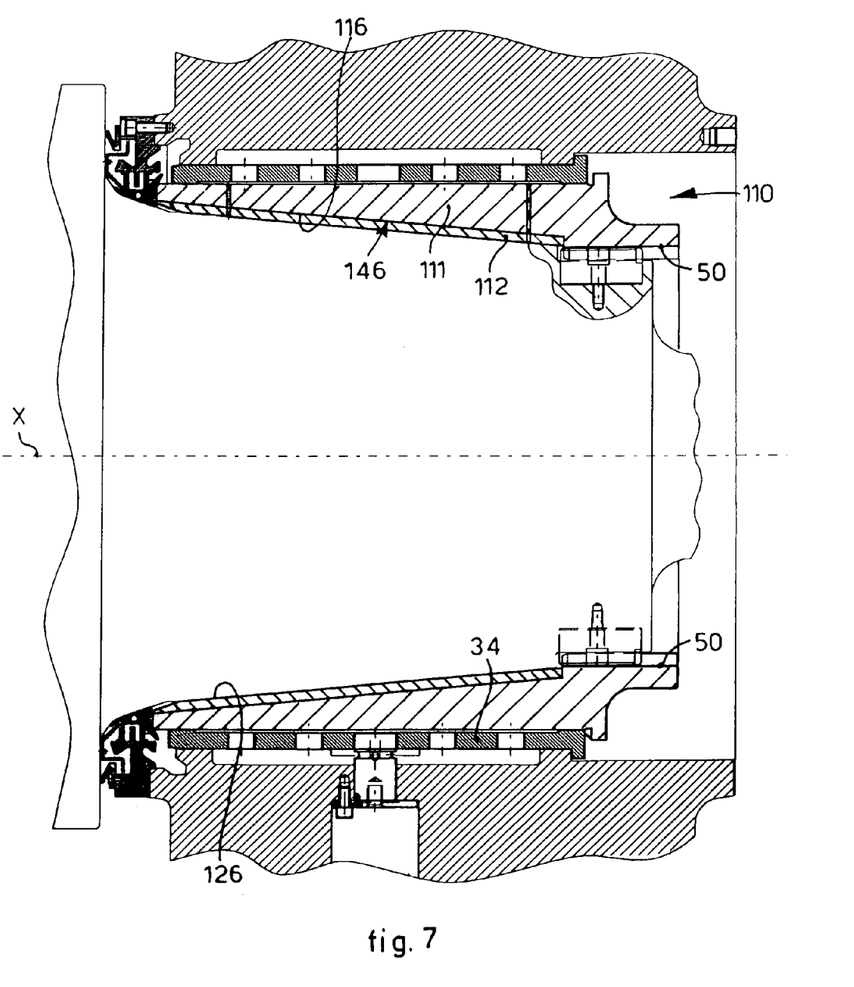
FIG. 7 is a section of the connection element according to a second formulation of the present invention.

A second formulation of the present invention is shown in FIG. 7 and is indicated for convenience by the reference number 110; the same reference numbers are used for identical parts.

In this second formulation, the connection element or sleeve 110 comprises a first external element 111 which has an external shape substantially of a cylindrical geometry with a truncated cone internal surface 116, to which a second internal element 112 is coupled.

This latter second element 112 has a truncated cone shape, mating with the internal truncated cone shape of the second element 111 and in turn has internally a surface which delimits a truncated cone seating 126, to couple to the neck 32 of the roll 30. Thus a conical coupling between the first external element 111 and the internal second element 112 is achieved.

The wall which delimits the internal seating 116 of the first element 111 cooperates with the mating external surface of the second element 112, so as to define a region of cooperation 146, in this case with a truncated cone geometry, between said two elements 111 and 112.

The first external element 111 and the second internal element 112 cooperate structurally, creating a synergic effect, in order to obtain a controlled ovalization of the bearing under the rolling load.

In this second formulation, the second internal element 112 has a constant thickness which varies from about 10 mm to about 25 mm, advantageously about 15 mm-18 mm.

Figure 8:
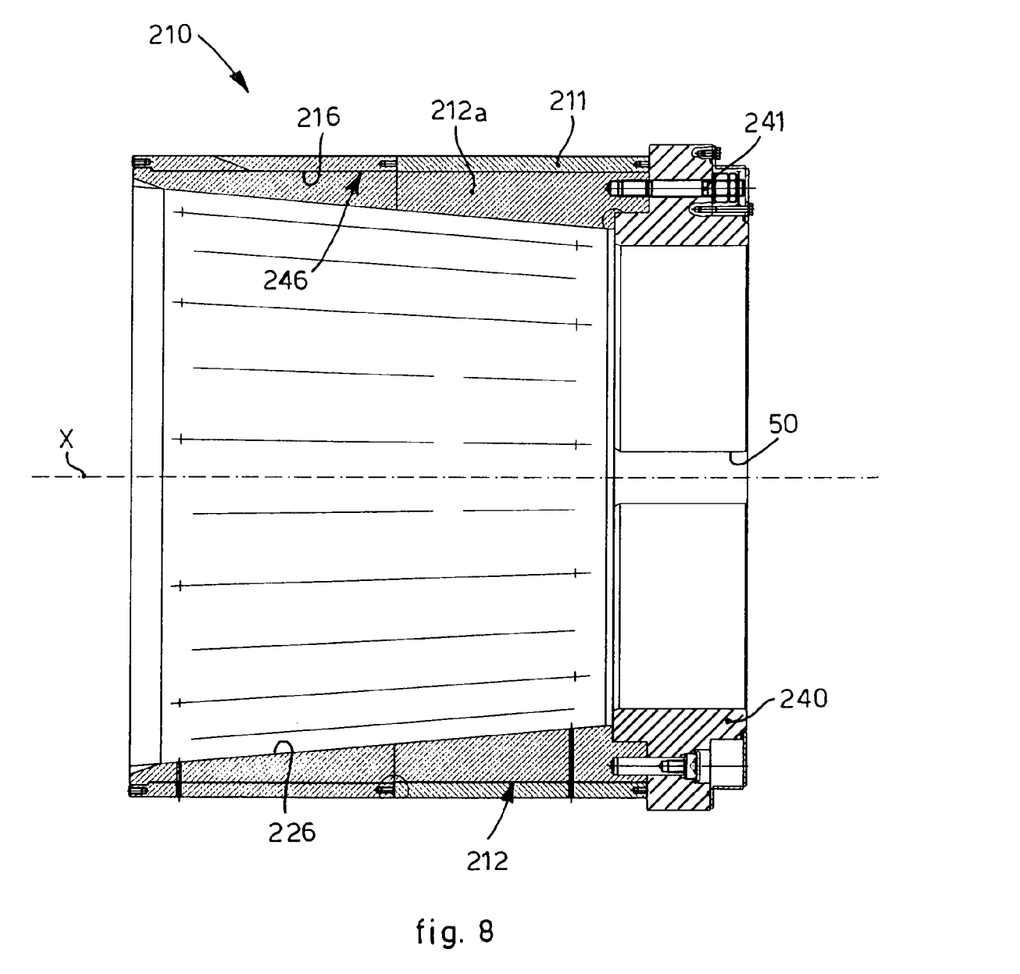
FIG. 8 is a section of another form of embodiment of the present invention.

A third formulation of the present invention is shown in FIG. 8 and is indicated for convenience with the reference number 210; the same reference numbers are used for identical parts.

The third form of embodiment is substantially similar to the first form of embodiment in FIG. 2 in that the connection element or sleeve 210 comprises a first external element 211 which has an external shape substantially of a cylindrical geometry with an internal surface 216 which is also of a cylindrical geometry, to which a second internal element 212 is associated for coupling to the neck 32 of the rolling roll 30.

However, unlike the first form of embodiment, the second internal element 212 is formed by two distinct parts, of which an internal part 212a, disposed inside the first element 211 and provided for coupling to the neck 32 of the rolling roll 30 and an external part configured as a flange 240 which provides clamping means, in this case a bolt, 241 by means of which the first external element 111 is clamped to the internal part 212a of the second internal element.

The separated flange 240 is assembled at the rear, toward the outside of the stand, on the first element 211 and on the internal part 212a of the second internal element, as can be seen in FIG. 8, and constrained to these by means of the clamping means 241. Consequently the second internal element is no longer made as a monolithic piece, but comprises two parts, of which the internal part 212a, which houses the neck 32 of the roll 30, typically made from a conical forged piece, and the external part configured as a clamping flange 240.

The third form of embodiment enhances the elastic properties of the sleeve in the load zone, optimizing the elastic behavior, which therefore leads to a greater capacity for redistributing pressures and therefore for bearing greater loads.

The third form of embodiment with the rear flange 240 produces a further optimization of the elastic behavior of the component of the sleeve near to the neck 32 of the roll 30, thus producing the benefits cited above: a "spread" of the hydrodynamic pressures on the angle of greater load and a reduction in the maximum peak of hydro-dynamic pressure. The final result is an increase in the load capacity of the bearing.

As in the first form of embodiment, the internal part 212a has a cylindrical shaped external part, mating with the internal shape of the first element 211 and internally has a surface which delimits a truncated cone seating 226, for coupling with the neck 32 of the roll 30.

The wall which delimits the internal seating 216 of the first element 211 cooperates with the mating external surface of the internal part 212a, to define a region of cooperation 246, in this case with a cylindrical geometry.

Furthermore, in this form of embodiment, in a manner that does not restrict the field of protection of the present invention, the cylindrical zone relating to the sliding diameter of the bearing is made by two jackets, rather than one, in order to increase productive efficiency.

It is clear that modifications and/or additions of parts may be made to the connection component or sleeve 10, 110, 210 for oil film bearings as described heretofore, without departing from the field and scope of the present invention.

It is also clear that, although the present invention has been described with reference to some specific examples, a person of skill in the art shall certainly be able to achieve many other equivalent forms of connection component or sleeve for oil film bearings, having the characteristics as set forth in the claims and hence all coming within the field of protection defined thereby.

The invention claimed is:

1. A connection element or sleeve located between a part or neck of a rolling roll and a relative housing bushing as present in a chock for rolling stands, comprising
a first external element and a second internal element, mated and movably coupled to be movable relative to each other, wherein the second internal element has internally a seating at least partly truncated cone shaped for coupling with the neck of the rolling roll,
wherein the first external element has a cylindrical external surface and an internal surface with an annular cross section, which delimits an internal seating for housing the second internal element, and
wherein the internal surface of the first external element is shaped like a truncated cone.

2. The connection element or sleeve as in claim 1, wherein the first external element has a constant thickness of 20 mm to 40 mm.

3. The connection element or sleeve or sleeve as in claim 1, wherein the first external element has a constant thickness of 20 mm-30 mm.

4. The connection element or sleeve or sleeve as in claim 1, wherein the second internal element is made of a member selected from the group consisting of bronze, cast iron, spheroidal cast iron, and steel.

5. The connection element or sleeve as in claim 1, wherein the first external element is made of a material having a Brinell hardness between 325 HB and 375 HB.

6. The connection element or sleeve or sleeve as in claim 1, wherein the second internal element has an annular cross section and has a truncated cone external surface mating with the truncated cone internal surface of the first external element.

7. The connection element or sleeve or sleeve as in claim 6, wherein the second internal element has a constant thickness from 10 mm to 25 mm.

8. The connection element or sleeve or sleeve as in claim 1, wherein the second internal element has a constant thickness from 15 mm-18 mm.

9. The connection element or sleeve or sleeve as in claim 1, wherein the at least partly truncated cone seating of the second internal element has an angle of inclination with an amplitude between 3° and 7° with respect to the axis of rotation of the roll.

10. The connection element or sleeve as in claim 1, having a region of cooperation for relative sliding between the first external element and the second internal element, defined by the external surface of the second internal element in cooperation with a wall of the internal surface of the first external element.

11. The connection element or sleeve as in claim 10, wherein anti-friction means are provided in the region of cooperation between the first external element and the second internal element.

12. The connection element or sleeve as in claim 11, wherein said antifriction means comprise a layer of anti-friction material.

13. The connection element or sleeve as in claim 10, wherein an annular chamber is made in the region of cooperation between the first external element and the second internal element inside which pressurized oil is also introduced.

14. The connection element or sleeve as in claim 10, wherein said first external element is made of a material having a Brinell hardness between 325 HB and about 375 HB.

15. The connection element or sleeve as in claim 10, wherein said first external element is made of a hardened and tempered steel thermally treated.

16. The connection element or sleeve as in claim 10, wherein the second internal element is made from two distinct parts, of which an internal part for coupling with the neck of the rolling roll and an external part configured as a flange which provides clamping means for clamping the first external element to the internal part of the second internal element.

17. The connection element as in claim 1, wherein the first external element is made of a material having a Brinell hardness between 325 HB and 375 HB and the second internal element is made of a member selected from the group consisting of bronze, cast iron, spheroidal cast iron, and steel.

* * * * *

UNITED STATES PATENT AND TRADEMARK OFFICE
CERTIFICATE OF CORRECTION

PATENT NO. : 8,585,294 B2  
APPLICATION NO. : 13/260164  
DATED : November 19, 2013  
INVENTOR(S) : Drigani et al.

Page 1 of 1

It is certified that error appears in the above-identified patent and that said Letters Patent is hereby corrected as shown below:

In the Claims:  
Claim 14, starting at column 9, line 6, amend as follows:  
"14. The connection element or sleeve as in claim 10, wherein said first external element is made of a material having a Brinell hardness between 325 HB and ~~about~~ 375 HB."

Signed and Sealed this  
Eleventh Day of February, 2014

Michelle K. Lee  
*Deputy Director of the United States Patent and Trademark Office*